US010692372B2

(12) United States Patent
Nilsson et al.

(10) Patent No.: US 10,692,372 B2
(45) Date of Patent: Jun. 23, 2020

(54) APPARTUS AND METHOD FOR ROAD VEHICLE DRIVER ASSISTANCE

(71) Applicant: VOLVO CAR CORPORATION, Gothenburg (SE)

(72) Inventors: Julia Nilsson, Gothenburg (SE); Mattias Erik Brannstrom, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 15/944,964

(22) Filed: Apr. 4, 2018

(65) Prior Publication Data

US 2018/0301029 A1 Oct. 18, 2018

(30) Foreign Application Priority Data

Apr. 12, 2017 (EP) .................... 17166138

(51) Int. Cl.
*G08G 1/0968* (2006.01)
*G08G 1/16* (2006.01)
(Continued)

(52) U.S. Cl.
CPC ... *G08G 1/096855* (2013.01); *G06K 9/00671* (2013.01); *G06K 9/00805* (2013.01);
(Continued)

(58) Field of Classification Search
CPC .......... G06K 9/00671; G06K 9/00805; G08G 1/096855; G08G 1/168; G08G 1/165;
(Continued)

(56) References Cited

U.S. PATENT DOCUMENTS 7,592,928 B2 * 9/2009 Chinomi ................... B60R 1/00
340/436
7,734,417 B2 * 6/2010 Chinomi ................... B60R 1/00
340/932.2
(Continued)

FOREIGN PATENT DOCUMENTS

| EP | 1 725 035 A1 | 11/2006 |
| EP | 1 731 366 A1 | 12/2006 |
| EP | 2 927 863 A1 | 10/2015 |

OTHER PUBLICATIONS

Extended European Search Report dated Sep. 29, 2017, Application No. 17166138.2-1803, Applicant Volvo Car Corporation, 10 Pages.

*Primary Examiner* — Obafemi O Sosanya
(74) *Attorney, Agent, or Firm* — Brooks Kushman P.C.

(57) ABSTRACT

This disclosure relates to an apparatus and a method for road vehicle driver assistance through which it is possible to determine critical obstacles that are within a predetermined proximity of a calculated maneuver corridor of the vehicle, representative of the full vehicle extension, and determination of corresponding critical points of the vehicle calculated to come into the predetermined proximity of the identified obstacles when traversing the calculated maneuver corridor. Separate from the bird's eye image of the vehicle and its surrounding is displayed at least one image acquired from a determined best camera angle and position to navigate critical obstacles. This provides a driver of an associated road vehicle with a clear overview of a current situation and provides immediate access to detailed views of one or more critical areas to navigate.

13 Claims, 6 Drawing Sheets

US 10,692,372 B2
Page 2

(51) Int. Cl.
*G06K 9/00* (2006.01)
*H04N 5/268* (2006.01)

(52) U.S. Cl.
CPC ............. *G08G 1/165* (2013.01); *G08G 1/166* (2013.01); *G08G 1/168* (2013.01); *H04N 5/268* (2013.01)

(58) Field of Classification Search
CPC ........ G08G 1/166; H04N 5/268; H04N 7/181; B60W 2420/42; B60W 30/0956; B60W 30/0953; B60W 30/09; B60W 30/02; B60W 2510/20; B60W 30/045; B60W 2710/20; B60R 1/00
See application file for complete search history.

(56) References Cited

U.S. PATENT DOCUMENTS

| | | | | |
|---|---|---|---|---|
| 8,805,601 | B2* | 8/2014 | Aso | B60W 30/10 701/21 |
| 9,174,641 | B2* | 11/2015 | Fritz | B60W 30/0956 |
| 9,174,672 | B2* | 11/2015 | Zeng | G05D 1/02 |
| 9,199,668 | B2* | 12/2015 | Zeng | G01S 7/4808 |
| 9,207,095 | B2* | 12/2015 | Gunther | G01C 21/3655 |
| 9,569,967 | B2* | 2/2017 | Petridis | G08G 1/16 |
| 9,715,633 | B2* | 7/2017 | Ogata | B60R 1/00 |
| 9,734,719 | B2* | 8/2017 | Flehmig | G08G 1/165 |
| 9,975,485 | B2* | 5/2018 | Kurihara | E02F 9/24 |
| 10,268,194 | B2* | 4/2019 | Noessner | B60T 7/22 |
| 2004/0098197 | A1* | 5/2004 | Matsumoto | B60T 8/17557 701/301 |
| 2004/0153228 | A1* | 8/2004 | Matsumoto | B60T 8/17552 701/41 |
| 2004/0158377 | A1* | 8/2004 | Matsumoto | B60T 8/17557 701/48 |
| 2004/0186650 | A1* | 9/2004 | Tange | B60T 8/17557 701/96 |
| 2004/0215393 | A1* | 10/2004 | Matsumoto | B60T 8/17557 701/300 |
| 2004/0230375 | A1* | 11/2004 | Matsumoto | B60T 8/17557 701/301 |
| 2005/0113999 | A1* | 5/2005 | Tange | B60T 8/17557 701/41 |
| 2005/0125153 | A1* | 6/2005 | Matsumoto | B60T 8/17557 701/300 |
| 2007/0003108 | A1* | 1/2007 | Chinomi | B60R 1/00 382/104 |
| 2013/0124041 | A1* | 5/2013 | Belser | B60W 30/095 701/41 |
| 2013/0218396 | A1* | 8/2013 | Moshchuk | B60W 50/08 701/25 |
| 2014/0032049 | A1* | 1/2014 | Moshchuk | B62D 15/0265 701/42 |
| 2015/0073664 | A1 | 3/2015 | Petridis et al. | |
| 2015/0310285 | A1* | 10/2015 | Ogata | B60R 1/00 382/104 |
| 2016/0236616 | A1* | 8/2016 | Kurihara | E02F 9/24 |
| 2016/0264135 | A1* | 9/2016 | Yamakado | B60W 30/045 |
| 2017/0026618 | A1* | 1/2017 | Mitsuta | B60R 1/00 |
| 2018/0137754 | A1* | 5/2018 | Alon | G06K 9/00785 |

* cited by examiner

US 10,692,372 B2

APPARTUS AND METHOD FOR ROAD VEHICLE DRIVER ASSISTANCE

CROSS-REFERENCE TO RELATED APPLICATIONS

This application claims foreign priority benefits under 35 U.S.C. § 119(a)-(d) to European patent application number EP 17166138.2, filed Apr. 12, 2017, which is incorporated by reference in its entirety.

TECHNICAL FIELD

The present application relates to an apparatus for road vehicle driver assistance and a method therefore.

BACKGROUND

When navigating a road vehicle, e.g., through narrow passages or when performing tight parking maneuvers therewith, it can be difficult to judge whether the vehicle will collide with surrounding objects, e.g., another vehicle. Hence, currently available parking assistance systems will sometimes show color coded lines and zones within a camera view provided by a forward or rearwards directed camera attached to the vehicle, in order to show how the vehicle will move based on a current steering command. This is done in order to aid a driver of the road vehicle to determine the distance to surrounding objects and to judge whether there is a risk that a collision with such a surrounding object will occur.

As described above, current driver assistance systems sometimes utilizes color coded lines and zones in the camera view in order to indicate the how the vehicle will move based on the current steering commands. As such, the color coded lines and zones are a means to aid the driver to determine the distance to surrounding objects and whether there is a risk of collisions with such surrounding objects. The camera is normally arranged to show the surrounding view behind or in front of the vehicle, usually depending on direction of the vehicle's motion, and how the vehicle will move based on the current steering command and distance to surrounding objects. However, since the most critical surrounding objects may be close the vehicle's side a 360° degree bird's eye view is sometimes a preferred option that some road vehicle drivers select to use.

For a driver, it can however be challenging to determine the distance to surrounding objects and judge whether there is a risk that a collision will occur, especially when using a 360° degree bird's eye view where the presented view usually is a composite of camera images from a plurality of cameras arranged to capture images in different directions covering the entire vehicle circumference.

Thus, there is still room for further improved road vehicle driver assistance apparatuses and methods.

SUMMARY

Embodiments herein aim to provide an improved road vehicle driver assistance apparatus.

This is provided through an apparatus comprising: a vehicle control command acquisition unit arranged to acquire at least one of current vehicle control commands relating to steering angle, acceleration, deceleration, velocity and shift position; an image acquisition unit arranged to acquire true-images at the circumference of the vehicle from a plurality of on-board cameras disposed on front, rear and sides of the vehicle; an image processing unit arranged to synthesize a plurality of the images taken by the plurality of on-board cameras to thereby create a bird's eye image looking down on the vehicle from above the vehicle; a display device arranged to display the created bird's eye image, an obstacle identification device arranged to identify obstacles around the vehicle, the apparatus further comprising: a processing unit arranged to calculate a maneuver corridor of the vehicle based on at least one of the acquired current vehicle control commands relating to steering angle, acceleration, deceleration and velocity, to represent the space that the vehicle extension, both front and rear, will traverse when travelling in accordance with the acquired current vehicle control commands; and in that: the processing unit further is arranged to determine, from the identified obstacles, critical obstacles that are within a predetermined proximity of the calculated maneuver corridor as well as corresponding critical points of the vehicle calculated to come into the predetermined proximity of the identified obstacles when traversing the calculated maneuver corridor; the image processing unit further is arranged to synthesize borders of the calculated maneuver corridor, representations of the critical obstacles, and marks for critical points of the vehicle; the display device further being arranged to display, overlaid the bird's eye image, the synthesized borders of the calculated maneuver corridor, representations of the critical obstacles, and the marks for critical points of the vehicle; the processing unit further is arranged to determine, from the true-images acquired at the circumference of the vehicle, best camera angles and positions to navigate critical points of the vehicle past critical obstacles; the display device further being arranged to display, separate from the bird's eye image, at least one image acquired from a determined best camera angle and position to navigate a critical obstacle.

The provision of a processing unit arranged to determine critical obstacles that are within a predetermined proximity of a calculated maneuver corridor, representative of the full vehicle extension, and determine corresponding critical points of the vehicle calculated to come into the predetermined proximity of the identified obstacles when traversing the calculated maneuver corridor, as well as a display device arranged to display, separate from the bird's eye image, at least one of respective images acquired from determined best camera angles and positions to navigate the respective critical obstacles provides a driver of the associated road vehicle with a clear overview of a current situation and provides immediate access to detailed views of one or more of the critical areas to navigate.

According to a second aspect is provided that the processing unit further is arranged to calculate the maneuver corridor of the vehicle based on the front left corner and right rear wheel of the vehicle when a current vehicle control command relating to steering angle is a control command for a right turn, and to calculate the maneuver corridor of the vehicle based on the front right corner and left rear wheel of the vehicle when a current vehicle control command relating to steering angle is a control command for a left turn.

The provision of calculating the maneuver corridor of the vehicle based on the front left corner and right rear wheel of the vehicle for a right turn, and to calculate the maneuver corridor of the vehicle based on the front right corner and left rear wheel of the vehicle for a left turn ensures a maneuver corridor that properly reflects the space that the vehicle will actually traverse.

According to a third aspect is provided that the display device, when no critical obstacles are determined, further is arranged to display, separate from the bird's eye image, a true-image forward view acquired from an on-board camera disposed on the front of the vehicle when a current vehicle control command relating to shift position is a control command for forward travel, and a true-image rearward view acquired from an on-board camera disposed on the rear of the vehicle when a current vehicle control command relating to shift position is a control command for reverse travel.

The provision of displaying a true-image forward view during forward travel and a true-image rearward view during rearward travel, as above, provides for appropriate vehicle driver assistance when no critical obstacles are determined.

According to a fourth aspect is provided that the image processing unit further is arranged to synthesize symbols corresponding to the marks for critical points of the vehicle; and that the display device further is arranged to display, overlaid each image acquired from a determined best camera angle and position to navigate a critical obstacle, a synthesized symbol corresponding to the mark for a critical point of the vehicle associated with that critical obstacle.

The provision of displaying, overlaid each image acquired from a determined best camera angle and position to navigate a critical obstacle, a synthesized symbol corresponding to the mark for a critical point of the vehicle associated with that critical obstacle provides identification of which critical point of the vehicle the displayed view relates to.

According to a fifth aspect is provided that the processing unit further is arranged to determine, corresponding critical points of the critical objects calculated to come into the predetermined proximity of the critical point of the vehicle when traversing the calculated maneuver corridor, and the image processing unit further is arranged to synthesize marks for critical points of the critical objects, and the display device further being arranged to display, overlaid the bird's eye image, the marks for critical points of the critical objects.

The provision of displaying, overlaid the bird's eye image, the marks for critical points of the critical objects provides a clear identification of such critical points and also for increased vehicle driver assistance through such identification.

According to a sixth aspect is provided that the image processing unit further is arranged to synthesize position markers for each respective of the on-board cameras disposed on front, rear and sides of the vehicle, and that the display device further is arranged to display, overlaid the bird's eye image, the synthesized camera position markers.

The provision of synthesizing position markers for each respective of the on-board cameras and displaying, overlaid the bird's eye image, the synthesized camera position markers provides a clear identification of such camera positions and also for increased vehicle driver assistance through such identification.

According to a seventh aspect is provided that the image processing unit further is arranged to synthesize highlighted position markers for each respective of the on-board cameras disposed on front, rear and sides of the vehicle for which an image acquired from a determined best camera angle and position to navigate a critical obstacle is determined, and that the display device further is arranged to display, overlaid the bird's eye image, the highlighted synthesized camera position markers for each displayed image acquired from a determined best camera angle and position to navigate a critical obstacle.

The provision of highlighted synthesized camera position markers for each displayed image acquired from a determined best camera angle and position to navigate a critical obstacle, overlaid the bird's eye image, provides a clear identification of the positions of cameras for which an image acquired from a determined best camera angle and position to navigate a critical obstacle is determined and thereby also for increased vehicle driver assistance through such identification.

According to an eight aspect is provided that the display device comprises one or more touch screen displays, and that the processing unit further is arranged to determine selective user interaction trough clicking for selecting a camera position marker on a touch screen display displaying the bird's eye image, and that the display device further is arranged to display, separate from the bird's eye image, an image acquired from the selected camera.

The provision of the display device comprising one or more touch screen displays, and that the processing unit further is arranged to determine selective user interaction trough clicking for selecting a camera position marker on a touch screen display displaying the bird's eye image, and that the display device further is arranged to display, separate from the bird's eye image, an image acquired from the selected camera provides for manual selection of which camera view to display and thereby for an interactively adaptable vehicle driver assistance.

According to a ninth aspect is provided that the display device comprises one or more touch screen displays, and that the processing unit further is arranged to determine selective user interaction trough clicking for selecting and dragging and dropping a camera position marker to a new position on a touch screen display displaying the bird's eye image, and to calculate based on such selective user interaction a new best camera angle and position, and that the display device further is arranged to display, separate from the bird's eye image, an image acquired from the camera angle and position calculated based on that selective user interaction.

The provision of determining selective user interaction trough clicking for selecting and dragging and dropping a camera position marker to a new position on a touch screen display displaying the bird's eye image, and to calculate based on such selective user interaction a new best camera angle and position, and displaying, separate from the bird's eye image, an image acquired from the camera angle and position calculated based on that selective user interaction provides for manual selection of such a new best camera angle and position view to display and thereby for still further interactively adaptable vehicle driver assistance.

According to a tenth aspect is provided that the image processing unit further is arranged to synthesize, from true-images acquired from one or more of the on-board cameras disposed on front, rear and sides of the vehicle, the image acquired from the camera angle and position calculated based on the selective user interaction.

The provision of synthesizing, from true-images acquired from one or more of the on-board cameras disposed on front, rear and sides of the vehicle, the image acquired from the camera angle and position calculated based on the selective user interaction provides for full freedom in manual selection of such a new best camera angle and position synthesized view to display and thereby for yet still further interactively adaptable vehicle driver assistance.

According to an eleventh aspect is provided that the display device comprises one or more touch screen displays, and that the processing unit further is arranged to determine selective user interaction trough clicking for selecting and dragging and dropping a camera position marker to a display position, separate from a display position used to display the bird's eye image, for selecting an image from the camera associated with that camera position marker, and that the display device further is arranged to display, to that display position, separate from the display position used to display the bird's eye image, an image acquired from the selected camera.

The provision of selective user interaction trough clicking for selecting and dragging and dropping a camera position marker to a display position, separate from a display position used to display the bird's eye image, for displaying an image acquired from the selected camera to that display position provides for provides for intuitive manual selection of a new camera angle and position image to display and thereby for further interactively adaptable vehicle driver assistance.

According to a twelfth aspect is provided a road vehicle that comprises an apparatus as above.

The provision of a road vehicle that comprises an apparatus as above provides detailed views useful for improved identification of one or more of the critical areas to navigate and thus for improved road vehicle driver assistance.

According to a thirteenth aspect is provided a method for road vehicle driver assistance, that comprises: acquiring at least one of current vehicle control commands relating to steering angle, acceleration, deceleration, velocity and shift position; acquiring true-images at the circumference of the vehicle from a plurality of on-board cameras disposed on front, rear and sides of the vehicle; synthesizing a plurality of the images taken by the plurality of on-board cameras to thereby create a bird's eye image looking down on the vehicle from above the vehicle; displaying the created bird's eye image, identifying obstacles around the vehicle; calculating a maneuver corridor of the vehicle based on at least one of the acquired current vehicle control commands relating to steering angle, acceleration, deceleration, velocity and shift position, to represent the space that the vehicle extension, both front and rear, will traverse when travelling in accordance with the acquired current vehicle control commands; determining, from the identified obstacles, critical obstacles that are within a predetermined proximity of the calculated maneuver corridor as well as corresponding critical points of the vehicle calculated to come into the predetermined proximity of the identified obstacles when traversing the calculated maneuver corridor; synthesizing borders of the calculated maneuver corridor, representations of the critical obstacles, and marks for critical points of the vehicle; displaying, overlaid the bird's eye image, the synthesized borders of the calculated maneuver corridor, representations of the critical obstacles, and the marks for critical points of the vehicle; determining, from the true-images acquired at the circumference of the vehicle, best camera angles and positions to navigate critical points of the vehicle past critical obstacles; displaying, separate from the bird's eye image, at least one image acquired from a determined best camera angle and position to navigate a critical obstacle.

A method as above provides a driver of the associated road vehicle with a clear overview of a current situation and provides immediate access to detailed views of one or more of the critical areas to navigate.

BRIEF DESCRIPTION OF THE DRAWINGS

In the following, embodiments herein will be described in greater detail by way of example only with reference to the attached drawings.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

This disclosure is based on the realization that it should be possible to provide an improved road vehicle 2 driver assistance apparatus.

This is provided based on the realization, firstly that a maneuver corridor reflecting the predicted future motion of the vehicle 2 should be calculated to properly reflect the space which the vehicle 2 actually will traverse, and secondly that the provision of a 360 degree bird's eye view, even if combined with a rear or front view, is not always the best option when navigating a road vehicle 2, e.g., through narrow passages or when performing tight parking maneuvers therewith.

Figure 1:
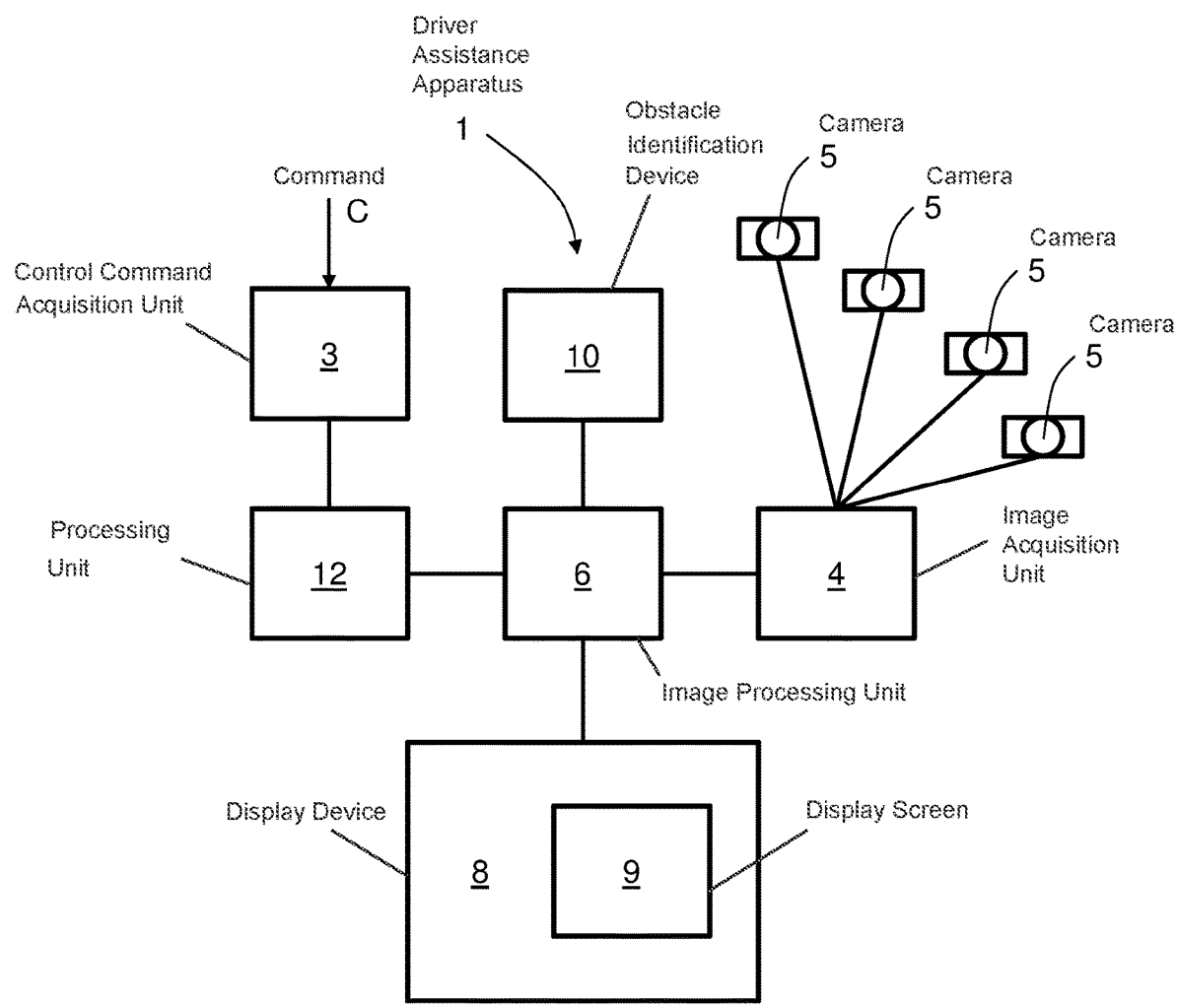
FIG. 1 is a schematic illustration of a road vehicle driver assistance apparatus according to embodiments presented herein.

As illustrated in FIG. 1, an improved road vehicle 2 driver assistance apparatus 1 is provided through an apparatus 1 configured as described in the following.

A vehicle 2 control command C acquisition unit of the apparatus is arranged to acquire at least one of current vehicle control commands C relating to steering angle, acceleration, deceleration, velocity and shift position. The shift position information may e.g., be acquired from a controller (not shown) arranged to control a drive system of the vehicle 2 via a CAN bus, for example. Such shift position information will usually, in the case of a manual transmission, contain information on the position of a shift lever (not shown) of the vehicle 2, and in the case of an automatic transmission, the position of a selector lever (not shown). The steering angle information may e.g., be acquired from a steering angle sensor (not shown) that senses a steering angle of the vehicle 2. Acceleration and deceleration information may be acquired from on-board accelerometers (not-shown). Vehicle 2 velocity information may e.g., be acquired from an on-board speedometer (not shown) or alternatively from a vehicle 2 borne satellite based navigational system, such as a GPS system, if available.

Figure 2:
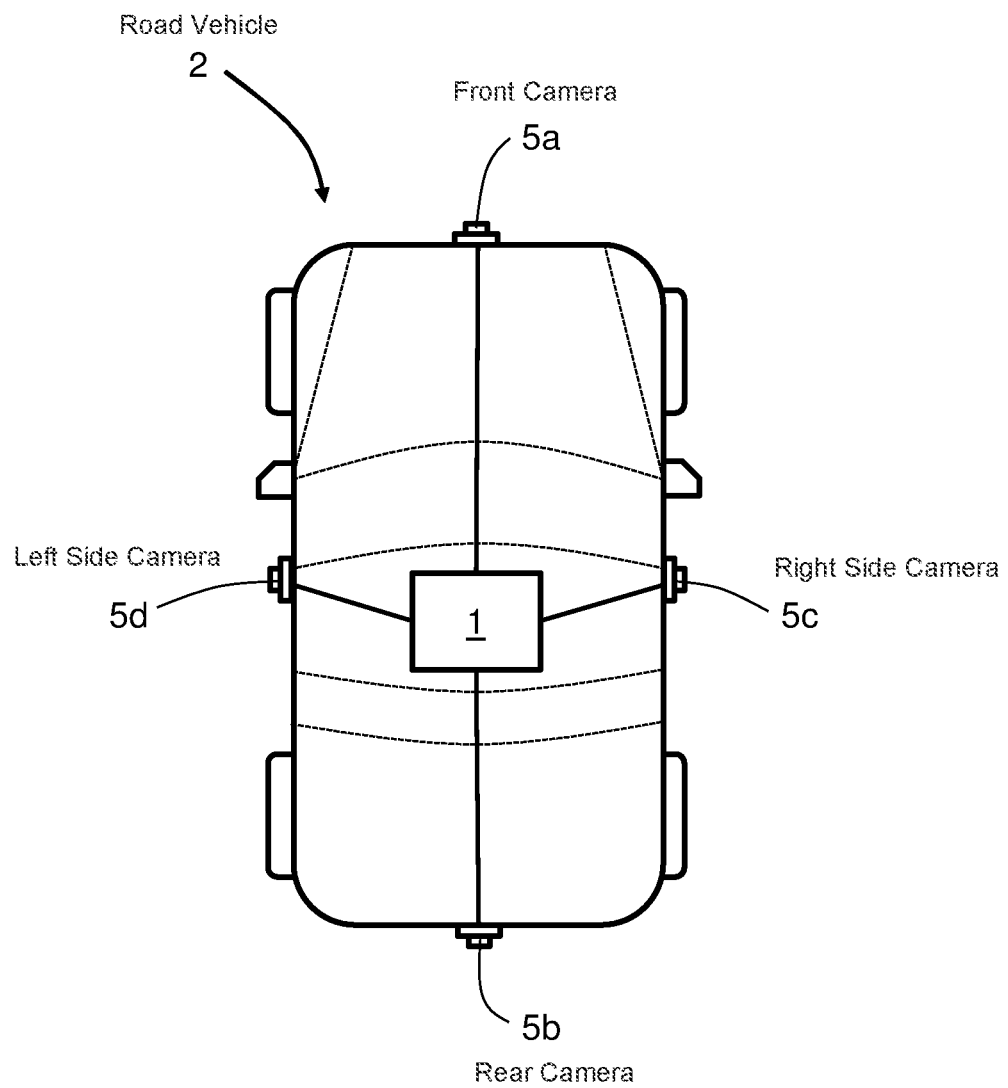
FIG. 2 is a schematic illustration of a road vehicle comprising a road vehicle driver assistance apparatus according to FIG. 1.

An image acquisition unit 4 of the apparatus 1 is arranged to acquire true-images at the circumference of the vehicle 2 from a plurality of on-board cameras 5 disposed on front, rear and sides of the vehicle 2, e.g., a front camera 5a, a rear camera 5b, a right side camera 5c, and a left side camera 5d that are attached on the front, the rear, the right side and the left side, respectively, of the vehicle 2, as illustrated in FIG. 2. The on-board cameras 5 may e.g., be composed of wide-angle CCD or CMOS cameras, each of which has an angle of view, for example, of approximately 180 degrees mounted on appropriate spots of the vehicle 2 so as to be capable of taking images of the entire area surrounding the vehicle 2.

Figure 3A:
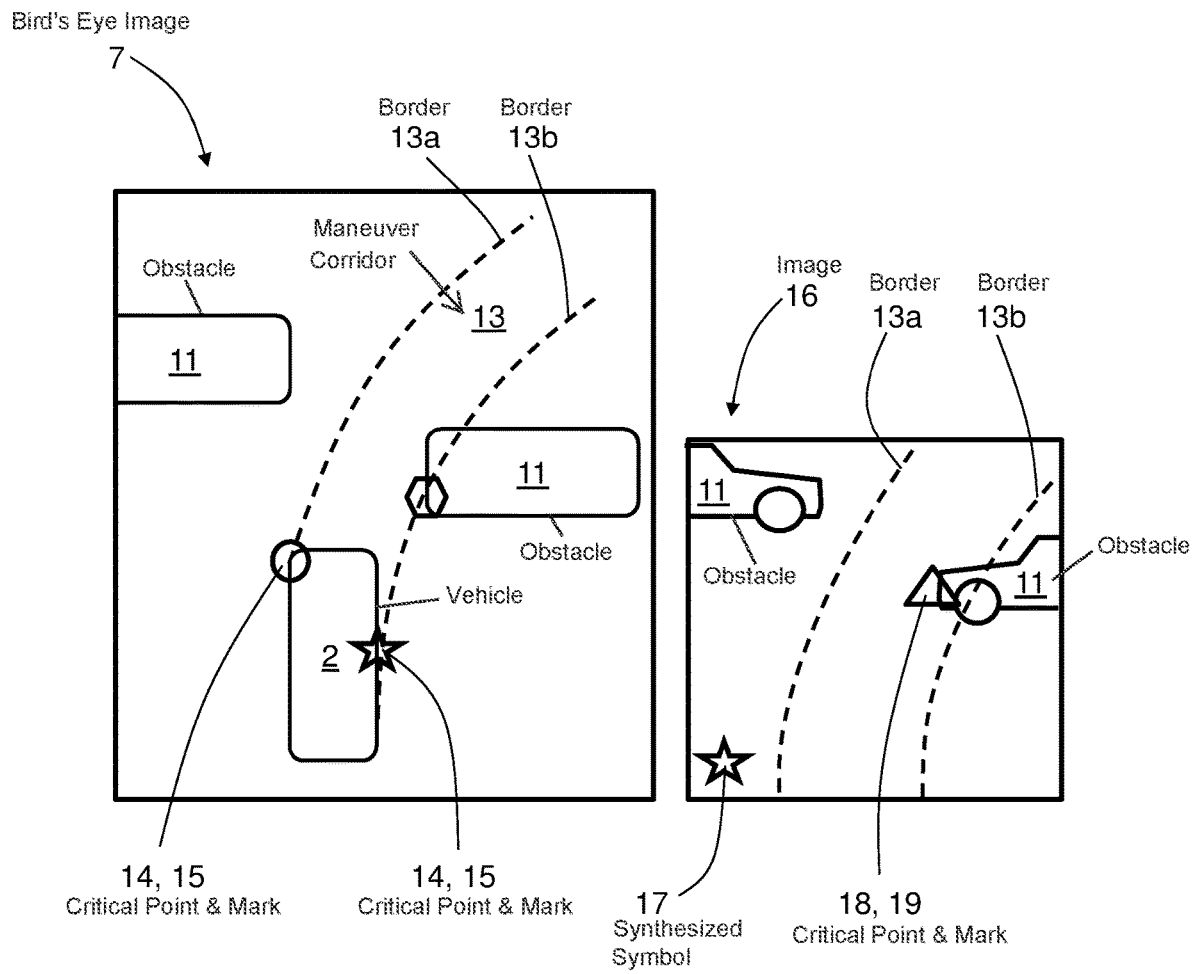
FIG. 3A is a schematic illustration of a bird's eye image and an image acquired from a determined best camera angle and position displayed, separate from the bird's eye image.

An image processing unit 6 of the apparatus 1 is arranged to synthesize a plurality of the images taken by the plurality of on-board cameras 5 to thereby create a bird's eye image 7 looking down on the vehicle 2 from above the vehicle 2, usually a computer graphic image 7 of the vehicle 2, as illustrated in FIG. 3A. The bird's eye view image may e.g., be generated by performing the viewpoint conversion for the images taken by the on-board cameras 5 to one another, thereby creating a bird's eye image 7 looking down on the entire periphery of the vehicle 2 as a center from a virtual viewpoint above the vehicle 2. Such a bird's eye view image 7 is generated using well-known techniques and thus not described in more detail herein.

The apparatus 1 further comprises a display device 8 arranged to display the created bird's eye image 7 to first position on a display 9 arranged in a driver compartment of the vehicle 2, such as e.g., a liquid crystal display or similar, which may be arranged as e.g., a center stack display, a head-up-display (HUD) or as part of an instrument cluster display.

An obstacle 11 identification device 10 is arranged to identify obstacles 11 around the vehicle 2. The obstacles 11 around the vehicle 2 may be identified e.g., through image processing for identifying objects from the images acquired around the vehicle 2, which are taken by the plurality of on-board cameras 5. Alternatively, or as a complement thereto, obstacles 11 around the vehicle 2 may be identified using on-board sensors (not shown), such as e.g., one or more ultrasonic sensors arranged to output an ultrasonic wave to the periphery of the vehicle 2 and detect a reflected wave thereof, radar or lidar sensors operating similarly but relying on electromagnetic waves or laser light.

The apparatus 1 further comprises a processing unit 12, e.g., comprising one or more microprocessors, arranged to calculate a maneuver corridor 13 of the vehicle 2 based on at least one of the acquired current vehicle control commands C relating to steering angle, acceleration, deceleration and velocity. The maneuver corridor 13 is calculated to represent the space that the vehicle 2 extension, both front and rear, will traverse when travelling in accordance with the acquired current vehicle control commands C, i.e., a band-like track corresponding to a real width traversed by the vehicle 2.

The processing unit 12 is further arranged to determine, from the identified obstacles 11, critical obstacles 11 that are within a predetermined proximity of the calculated maneuver corridor 13, e.g., within 0.3 m thereof or other suitable predetermined distance. The processing unit 12 is further arranged to determine corresponding critical points 15 of the vehicle 2 calculated to come into the predetermined proximity of the identified obstacles 11 when traversing the calculated maneuver corridor 13.

The image processing unit 6 is further arranged to synthesize borders 13a, 13b (shown as dashed lines in the figures) of the calculated maneuver corridor 13, e.g., based at the rear of vehicle 2 if the vehicle 2 is in forward motion, and based at the front of the vehicle 2 if the vehicle 2 is in rearward motion, representations of the critical obstacles 11, and marks 14 for critical points 15 of the vehicle 2, and the display device 8 is further arranged to display, overlaid the bird's eye image 7, the synthesized borders 13a, 13b of the calculated maneuver corridor 13, representations of the critical obstacles 11, and the marks 14 for critical points 15 of the vehicle 2. The borders 13a, 13b of the calculated maneuver corridor 13, the representations of the critical obstacles 11 as well as the marks 14 for critical points 15 of the vehicle 2 may e.g., be presented using graphics in different colors, having different outlines or different appearances.

The processing unit 12 of the apparatus 1 is further arranged to determine, from the true-images acquired at the circumference of the vehicle 2, best camera angles and positions to navigate critical points 15 of the vehicle 2 past critical obstacles 11 and the display device 8 is further arranged to display, separate from the bird's eye image 7, at least one image 16 acquired from a determined best camera angle and position to navigate a critical obstacle 11. Separate from the bird's eye image 7 is meant to include displaying the at least one image 16 acquired from a determined best camera angle and position to navigate a critical obstacle 11 to a separate position, display area, at one and the same display screen 9, i.e., next to the bird's eye view, but also to include displaying the at least one image 16 acquired from a determined best camera angle and position to navigate a critical obstacle 11 to a separate position, display area, at one or more additional display screens 9 (not shown).

Thus, through determining critical obstacles 11 that are within a predetermined proximity of a calculated maneuver corridor 13, representative of the full vehicle 2 extension, and determining corresponding critical points 15 of the vehicle 2 calculated to come into the predetermined proximity of the identified obstacles 11 when traversing the calculated maneuver corridor 13, and displaying, separate from the bird's eye image 7, at least one of the respective images 16 acquired from determined best camera angles and positions to navigate the respective critical obstacles 11, a driver of the associated road vehicle 2 can be provided with a clear overview of a current situation and immediate access to detailed views 16 of one or more of the critical areas to navigate.

In order to provide a maneuver corridor 13 that properly reflect the space which the vehicle 2 actually will traverse the processing unit 12 is, according to some embodiments, further arranged to calculate the maneuver corridor 13 of the vehicle 2 based on the front left corner and right rear wheel of the vehicle 2 when a current vehicle 2 control command C relating to steering angle is a control command C for a right turn, and to calculate the maneuver corridor 13 of the vehicle 2 based on the front right corner and left rear wheel of the vehicle 2 when a current vehicle 2 control command C relating to steering angle is a control command C for a left turn. Hereby it is possible to ensure a maneuver corridor 13 that properly reflects the space that the vehicle 2 will actually traverse.

In order to provide for appropriate vehicle 2 driver assistance when no critical obstacles 11 are determined, according to some embodiments the display device 8 is further arranged to display, separate from the bird's eye image 7, a true-image forward view acquired from an on-board camera 5a disposed on the front of the vehicle 2 when a current vehicle 2 control command C relating to shift position is a control command C for forward travel, and a true-image rearward view acquired from an on-board camera 5b disposed on the rear of the vehicle 2 when a current vehicle 2 control command C relating to shift position is a control command C for reverse travel.

In still further embodiments the image processing unit 6 is further arranged to synthesize symbols corresponding to the marks 14 for critical points 15 of the vehicle 2. In such embodiments the display device 8 is further arranged to display, overlaid each image 16 acquired from a determined best camera angle and position to navigate a critical obstacle 11, a synthesized symbol 17 corresponding to the mark 14 for a critical point 15 of the vehicle 2 associated with that critical obstacle 11. This is done in order to facilitate identification of which critical point 15 of the vehicle 2 the displayed view 16 relates to. Thus, when the apparatus 1 detects that there are objects 11 close to the maneuver corridor 13, e.g., within 30 cm, the image 16 is switched to provide a projection of the best possible camera angle and position to get past the obstacle 11. When this happens, the camera image 16 is marked with a small symbol 17 in e.g., a corner of the image 16 with a corresponding marker 14 with the same color or shape on the vehicle 2 presented in the bird's eye image 7.

In yet some embodiments the processing unit 12 is further arranged to determine, corresponding critical points 18 of the critical objects 11 calculated to come into the predetermined proximity of the critical point 15 of the vehicle 2 when traversing the calculated maneuver corridor 13. In such embodiments the image processing unit 6 is further arranged to synthesize marks 19 for critical points 18 of the critical objects 11, and the display device 8 is further arranged to display, overlaid the bird's eye image 7, the marks 19 for critical points 18 of the critical objects 11 which provides a clear identification of such critical points 18.

Figure 3B:
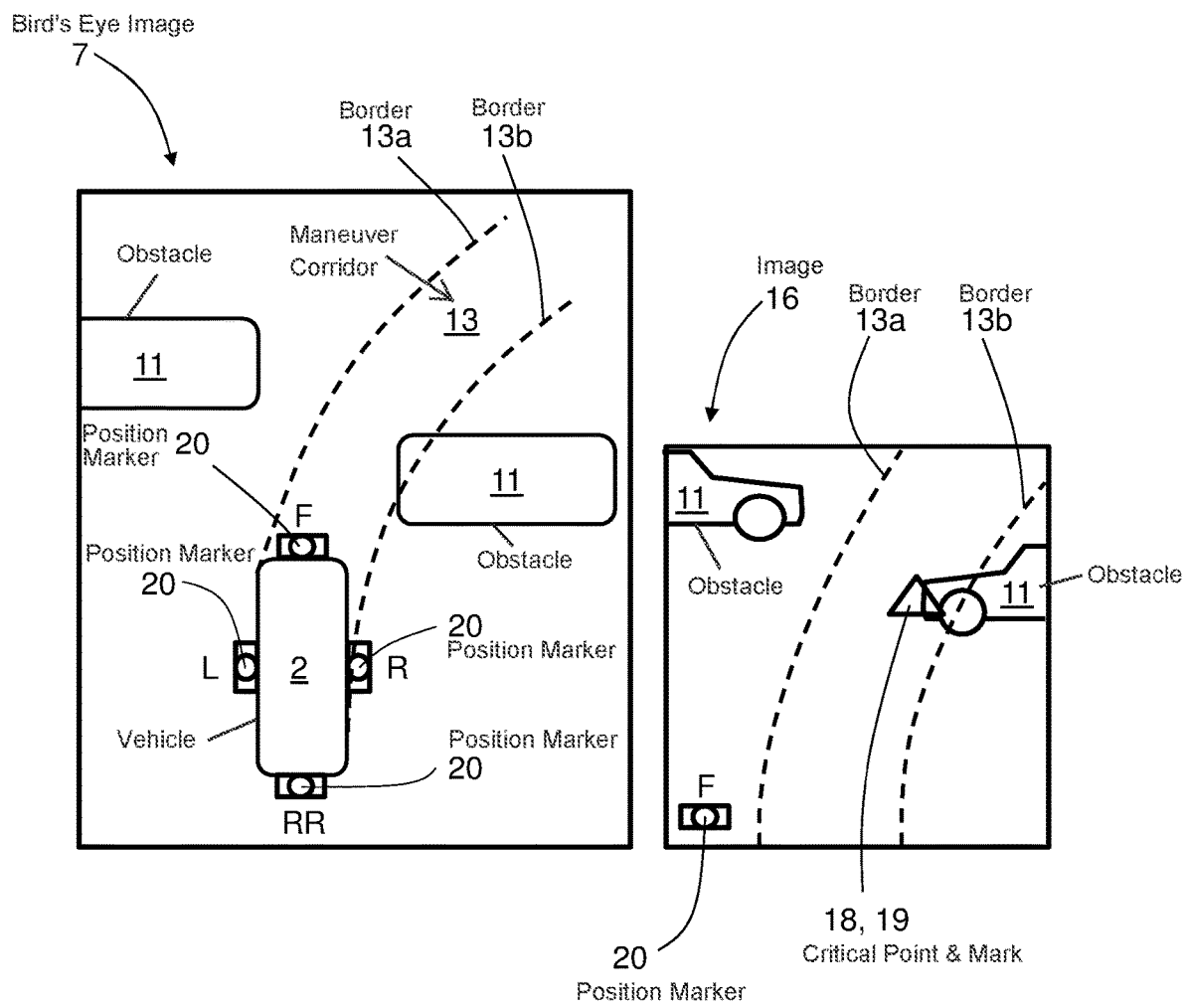
FIG. 3B is a schematic illustration of an embodiment where synthesized position markers for on-board cameras are provided to the images according to FIG. 3A.

According to still further embodiments, as e.g., illustrated in FIG. 3B, the image processing unit 6 is further arranged to synthesize position markers 20 for each respective of the on-board cameras 5 disposed on front, rear and sides of the vehicle 2, and the display device 8 is further arranged to display, overlaid the bird's eye image 7, the synthesized camera position markers 20 to provide a clear identification of such camera positions and also increased vehicle 2 driver assistance through such identification.

Figure 3C:
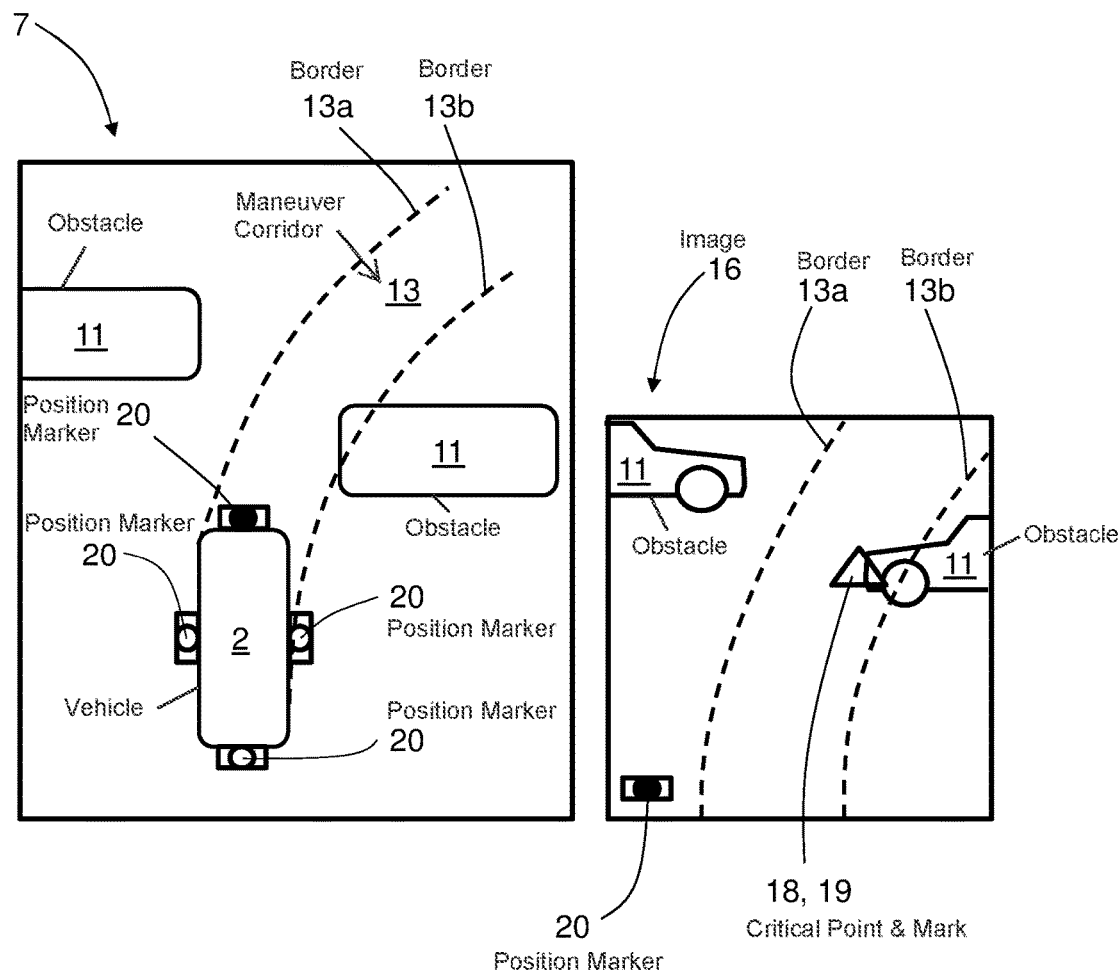
FIG. 3C is a schematic illustration of an embodiment where synthesized highlighted position markers for on-board cameras are provided to the images according to FIG. 3A.

In a yet further embodiment, as e.g., illustrated in FIG. 3C, the image processing unit 6 is further arranged to synthesize highlighted position markers 20 for each respective of the on-board cameras 5 disposed on front, rear and sides of the vehicle 2 for which an image 16 acquired from a determined best camera angle and position to navigate a critical obstacle 11 is determined. In such embodiments the display device 8 is further arranged to display, overlaid the bird's eye image 7, the highlighted synthesized camera position markers 20 for each displayed image 16 acquired from a determined best camera angle and position to navigate a critical obstacle 11. This provides a clear identification of the positions of cameras 5 for which an image 16 acquired from a determined best camera angle and position to navigate a critical obstacle 11 is determined, and thereby also provides for increased vehicle 2 driver assistance through such identification.

In some further embodiments the display device 8 comprises one or more touch screen displays 9. According to such further embodiments the processing unit 12 is further arranged to determine selective user interaction trough clicking for selecting a camera position marker 20 on a touch screen display 9 displaying the bird's eye image 7, and the display device 8 is further arranged to display, separate from the bird's eye image 7, an image 16 acquired from the selected camera 5, hereby allowing manual selection of which camera view to display and thereby providing for an interactively adaptable vehicle 2 driver assistance.

In an alternative embodiment the display device 8 comprises one or more touch screen displays 9, and the processing unit 12 is further arranged to determine selective user interaction trough clicking for selecting and dragging and dropping a camera position marker 20 to a new position on a touch screen display 9 displaying the bird's eye image 7. In such embodiments the processing unit 12 is further arranged to calculate, based on such selective user interaction, a new best camera angle and position. Finally, the display device 8 is arranged to display, separate from the bird's eye image 7, an image 16 acquired from the camera angle and position calculated based on that selective user interaction. This provides for manual selection of such a new best camera angle and position view to display and thereby for interactively adaptable vehicle 2 driver assistance. In an extension of the above embodiment is also envisaged that the image processing unit 6 further is arranged to synthesize, from true-images acquired from one or more of the on-board cameras 5 disposed on front, rear and sides of the vehicle 2, the image 16 acquired from the camera angle and position calculated based on the selective user interaction in order to provide for full freedom in manual selection of such a new best camera angle and position synthesized view 16 to display.

In yet an alternative embodiment the display device 8 comprises one or more touch screen displays 9, and the processing unit 12 is further arranged to determine selective user interaction trough clicking for selecting and dragging and dropping a camera position marker 20 to a display position, separate from a display position used to display the bird's eye image 7, for selecting an image from the camera 5 associated with that camera position marker 20. In such alternative embodiments the display device 8 is further arranged to display, to that display position, separate from the display position used to display the bird's eye image 7, an image 16 acquired from the thus selected camera 5, providing for intuitive manual selection of a new camera angle and position image 16 to display.

As one skilled in the art would understand, the vehicle control command acquisition unit 3, the image acquisition unit 4, the image processing unit 6, the display device 8, the processing unit 12, and any other unit, system, subsystem, device or module described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Figure 4:
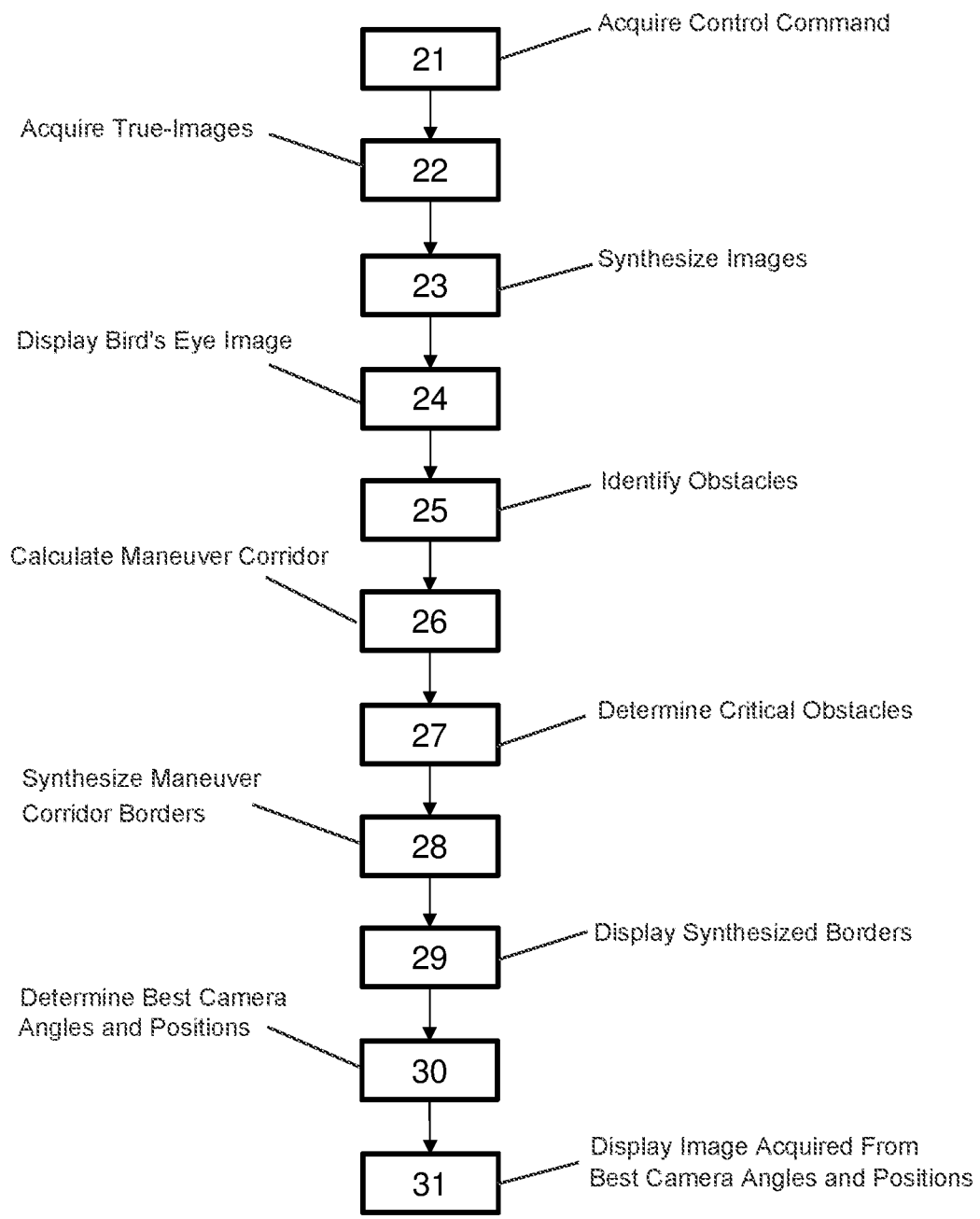
FIG. 4 is a schematic illustration of a method for road vehicle driver assistance according to embodiments herein.

Still further envisaged herein is a road vehicle 2, as illustrated in FIG. 4, which comprises an apparatus 1 as above. Such a road vehicle 2 will thus be able to provide detailed views useful for improved identification of one or more of the critical areas to navigate.

In accordance with the present application is also envisaged a method for road vehicle 2 driver assistance according to embodiments herein, as illustrated schematically in FIG. 4.

The method comprises: 21—acquiring at least one of current vehicle 2 control commands C relating to steering angle, acceleration, deceleration, velocity and shift position; 22—acquiring true-images at the circumference of the vehicle 2 from a plurality of on-board cameras 5 disposed on front, rear and sides of the vehicle 2; 23—synthesizing a plurality of the images taken by the plurality of on-board cameras 5 to thereby create a bird's eye image 7 looking down on the vehicle 2 from above the vehicle 2; 24—displaying the created bird's eye image 7; 25—identifying obstacles 11 around the vehicle 2; 26—calculating a maneuver corridor 13 of the vehicle 2 based on at least one of the acquired current vehicle 2 control commands C relating to steering angle, acceleration, deceleration and velocity, to represent the space that the vehicle 2 extension, both front and rear, will traverse when travelling in accordance with the acquired current vehicle 2 control commands C; 27—determining, from the identified obstacles 11, critical obstacles 11 that are within a predetermined proximity of the calculated maneuver corridor 13 as well as corresponding critical points 15 of the vehicle 2 calculated to come into the predetermined proximity of the identified obstacles 11 when traversing the calculated maneuver corridor 13; 28—synthesizing borders 13a, 13b of the calculated maneuver corridor 13, representations of the critical obstacles 11, and marks 14 for critical points 15 of the vehicle 2; 29—displaying, overlaid the bird's eye image 7, the synthesized borders 13a, 13b of the calculated maneuver corridor 13, representations of the critical obstacles 11, and the marks 14 for critical points 15 of the vehicle 2; 30—determining, from the true-images acquired at the circumference of the vehicle 2, best camera angles and positions to navigate critical points 15 of the vehicle 2 past critical obstacles 11; 31—displaying, separate from the bird's eye image 7, at least one image 16 acquired from a determined best camera angle and position to navigate a critical obstacle 11.

A method as above provides a driver of the associated road vehicle 2 with a clear overview of a current situation and provides immediate access to detailed views 16 of one or more of the critical areas to navigate.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A road vehicle driver assistance apparatus comprising:
a vehicle control command acquisition unit configured to acquire a current vehicle control command relating to steering angle, and to acquire at least one of current vehicle control commands relating to acceleration and deceleration;
an image acquisition unit configured to acquire true-images at a circumference of the vehicle from a plurality of on-board cameras disposed on a front, a rear and sides of the vehicle;
an image processing unit configured to synthesize a plurality of the true-images taken by the plurality of on-board cameras to thereby create a bird's eye image looking down on the vehicle from above the vehicle;
a display device configured to display the created bird's eye image;
an obstacle identification device configured to identify obstacles around the vehicle; and
a processing unit configured to calculate a maneuver corridor of the vehicle based on the acquired current vehicle control command relating to steering angle and based on at least one of the acquired at least one of current vehicle control commands relating to acceleration and deceleration, to represent a space that the vehicle will traverse when travelling in accordance with the acquired current vehicle control commands, wherein the processing unit is configured to determine, from the identified obstacles, critical obstacles that are within a predetermined proximity of the calculated maneuver corridor as well as corresponding critical points of the vehicle calculated to come into the predetermined proximity of the identified obstacles when traversing the calculated maneuver corridor;
wherein the image processing unit is further configured to synthesize borders of the calculated maneuver corridor, representations of the critical obstacles, and marks for critical points of the vehicle;
the display device is further configured to display, overlaid on the bird's eye image, the synthesized borders of the calculated maneuver corridor, the representations of the critical obstacles, and the marks for critical points of the vehicle;
the processing unit is further configured to determine, from the true-images acquired at the circumference of the vehicle, best camera angles and positions to navigate the critical points of the vehicle past the critical obstacles;
the display device is further configured to display, separate from the bird's eye image, at least one image acquired from a determined best camera angle and position to navigate a critical obstacle; and
the processing unit is further configured to calculate the maneuver corridor of the vehicle based on a front left corner and right rear wheel of the vehicle when a current vehicle control command relating to steering angle is a control command for a right turn, and to calculate the maneuver corridor of the vehicle based on a front right corner and left rear wheel of the vehicle when a current vehicle control command relating to steering angle is a control command for a left turn.

2. The apparatus according to claim 1 wherein the display device, when no critical obstacles are determined, is further configured to display, separate from the bird's eye image, a true-image forward view acquired from an on-board camera disposed on the front of the vehicle when a current vehicle control command relating to shift position is a control command for forward travel, and a true-image rearward view acquired from an on-board camera disposed on the rear of the vehicle when a current vehicle control command relating to shift position is a control command for reverse travel.

3. The apparatus according to claim 1 wherein the image processing unit is further configured to synthesize symbols corresponding to the marks for critical points of the vehicle, and the display device is further configured to display, overlaying each image acquired from a determined best camera angle and position to navigate a critical obstacle, a synthesized symbol corresponding to the mark for a critical point of the vehicle associated with that critical obstacle.

4. The apparatus according to claim 1 wherein the processing unit is further configured to determine corresponding critical points of the critical obstacles calculated to come into the predetermined proximity of the critical point of the vehicle when traversing the calculated maneuver corridor, the image processing unit is further configured to synthesize marks for critical points of the critical objects, and the display device is further configured to display, overlaying the bird's eye image, the marks for critical points of the critical objects.

5. The apparatus according to claim 1 wherein the image processing unit is further configured to synthesize position markers for each of the on-board cameras disposed on the front, the rear and the sides of the vehicle, and the display device is further configured to display, overlaying the bird's eye image, the synthesized camera position markers.

6. The apparatus according to claim 1 wherein the image processing unit is further configured to synthesize highlighted position markers for each of the on-board cameras disposed on the front, the rear and the sides of the vehicle for which an image acquired from a determined best camera angle and position to navigate a critical obstacle is determined, and the display device is further is arranged to display, overlaying the bird's eye image, the highlighted synthesized camera position markers for each displayed image acquired from a determined best camera angle and position to navigate a critical obstacle.

7. The apparatus according to claim 6 wherein the display device comprises one or more touch screen displays, the processing unit is further configured to determine selective user interaction trough clicking for selecting a camera position marker on a touch screen display displaying the bird's eye image, and the display device is further configured to display, separate from the bird's eye image, an image acquired from the selected camera.

8. The apparatus according to claim 6 wherein the display device comprises one or more touch screen displays, and the processing unit is further configured to determine selective user interaction trough clicking for selecting and dragging and dropping a camera position marker to a new position on a touch screen display displaying the bird's eye image, and to calculate based on such selective user interaction a new best camera angle and position, and wherein the display device is further configured to display, separate from the bird's eye image, an image acquired from the camera angle and position calculated based on that selective user interaction.

9. The apparatus according to claim 8 wherein the image processing unit is further configured to synthesize, from true-images acquired from one or more of the on-board cameras disposed on the front, the rear and the sides of the vehicle, the image acquired from the camera angle and position calculated based on the selective user interaction.

10. The apparatus according to claim 6 wherein the display device comprises one or more touch screen displays, and the processing unit is further configured to determine selective user interaction trough clicking for selecting and dragging and dropping a camera position marker to a display position, separate from a display position used to display the bird's eye image, for selecting an image from the camera associated with that camera position marker, and the display device is further configured to display, to that display position, separate from the display position used to display the bird's eye image, an image acquired from the selected camera.

11. A road vehicle comprising the apparatus according to claim 1.

12. A method for road vehicle driver assistance, the method comprising:
    acquiring a current vehicle control command relating to steering angle, and to acquire at least on of current vehicle control commands relating to acceleration and deceleration;
    acquiring true-images at a circumference of the vehicle from a plurality of on-board cameras disposed on a front, a rear and sides of the vehicle;
    synthesizing a plurality of the true-images acquired by the plurality of on-board cameras to thereby create a bird's eye image looking down on the vehicle from above the vehicle;
    displaying the created bird's eye image;
    identifying obstacles around the vehicle;
    calculating a maneuver corridor of the vehicle based on the acquired current vehicle control command relating to steering angle and based on at least one of the acquired at least one of current vehicle control commands relating to acceleration and deceleration, to represent space that the vehicle will traverse when travelling in accordance with the acquired current vehicle control commands;
    determining, from the identified obstacles, critical obstacles that are within a predetermined proximity of the calculated maneuver corridor as well as corresponding critical points of the vehicle calculated to come into the predetermined proximity of the identified obstacles when traversing the calculated maneuver corridor;
    synthesizing borders of the calculated maneuver corridor, representations of the critical obstacles, and marks for critical points of the vehicle;
    displaying, overlaying the bird's eye image, the synthesized borders of the calculated maneuver corridor, the representations of the critical obstacles, and the marks for critical points of the vehicle;
    determining, from the true-images acquired at the circumference of the vehicle, best camera angles and positions to navigate the critical points of the vehicle past the critical obstacles;
    displaying, separate from the bird's eye image, at least one image acquired from a determined best camera angle and position to navigate a critical obstacle;
    calculating the maneuver corridor of the vehicle based on a front left corner and right rear wheel of the vehicle when a current vehicle control command relating to steering angle is a control command for a right turn; and
    calculating the maneuver corridor of the vehicle based on a front right corner and left rear wheel of the vehicle when a current vehicle control command relating to steering angle is a control command for a left turn.

13. A road vehicle driver assistance apparatus comprising:
    a vehicle control command acquisition unit configured to acquire a current vehicle control command relating to steering angle, and to acquire at least one of current vehicle control commands relating to acceleration or deceleration;

an image acquisition unit configured to acquire true-images at a circumference of the vehicle from a plurality of on-board cameras disposed on a front, a rear and sides of the vehicle;

an image processing unit configured to synthesize a plurality of the true-images taken by the plurality of on-board cameras to thereby create a bird's eye image looking down on the vehicle from above the vehicle;

a display device configured to display the created bird's eye image;

an obstacle identification device configured to identify obstacles around the vehicle; and a processing unit configured to calculate a maneuver corridor of the vehicle based on the acquired current vehicle control command relating to steering angle and based on the at least one acquired current vehicle control command relating to acceleration or deceleration, to represent a space that the vehicle will traverse when travelling in accordance with the acquired current vehicle control commands, wherein the processing unit is configured to determine, from the identified obstacles, critical obstacles that are within a predetermined proximity of the calculated maneuver corridor as well as corresponding critical points of the vehicle calculated to come into the predetermined proximity of the identified obstacles when traversing the calculated maneuver corridor;

wherein the image processing unit is further configured to synthesize borders of the calculated maneuver corridor, representations of the critical obstacles, and marks for critical points of the vehicle;

the display device is further configured to display, overlaying the bird's eye image, the synthesized borders of the calculated maneuver corridor, the representations of the critical obstacles, and the marks for critical points of the vehicle;

the processing unit is further configured to determine, from the true-images acquired at the circumference of the vehicle, best camera angles and positions to navigate the critical points of the vehicle past the critical obstacles;

the display device is further configured to display, separate from the bird's eye image, at least one image acquired from a determined best camera angle and position to navigate a critical obstacle; and the processing unit is further configured to calculate the maneuver corridor of the vehicle based on a front left corner and right rear wheel of the vehicle when a current vehicle control command relating to steering angle is a control command for a right turn, and to calculate the maneuver corridor of the vehicle based on a front right corner and left rear wheel of the vehicle when a current vehicle control command relating to steering angle is a control command for a left turn.

* * * * *

UNITED STATES PATENT AND TRADEMARK OFFICE
CERTIFICATE OF CORRECTION

PATENT NO. : 10,692,372 B2
APPLICATION NO. : 15/944964
DATED : June 23, 2020
INVENTOR(S) : Julia Nilsson et al.

Page 1 of 1

It is certified that error appears in the above-identified patent and that said Letters Patent is hereby corrected as shown below:

In the Claims

Column 14, Line 16, Claim 12:
After "and to acquire at least"
Delete "on" and
Insert -- one --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*